United States Patent Office 3,460,220
Patented Aug. 12, 1969

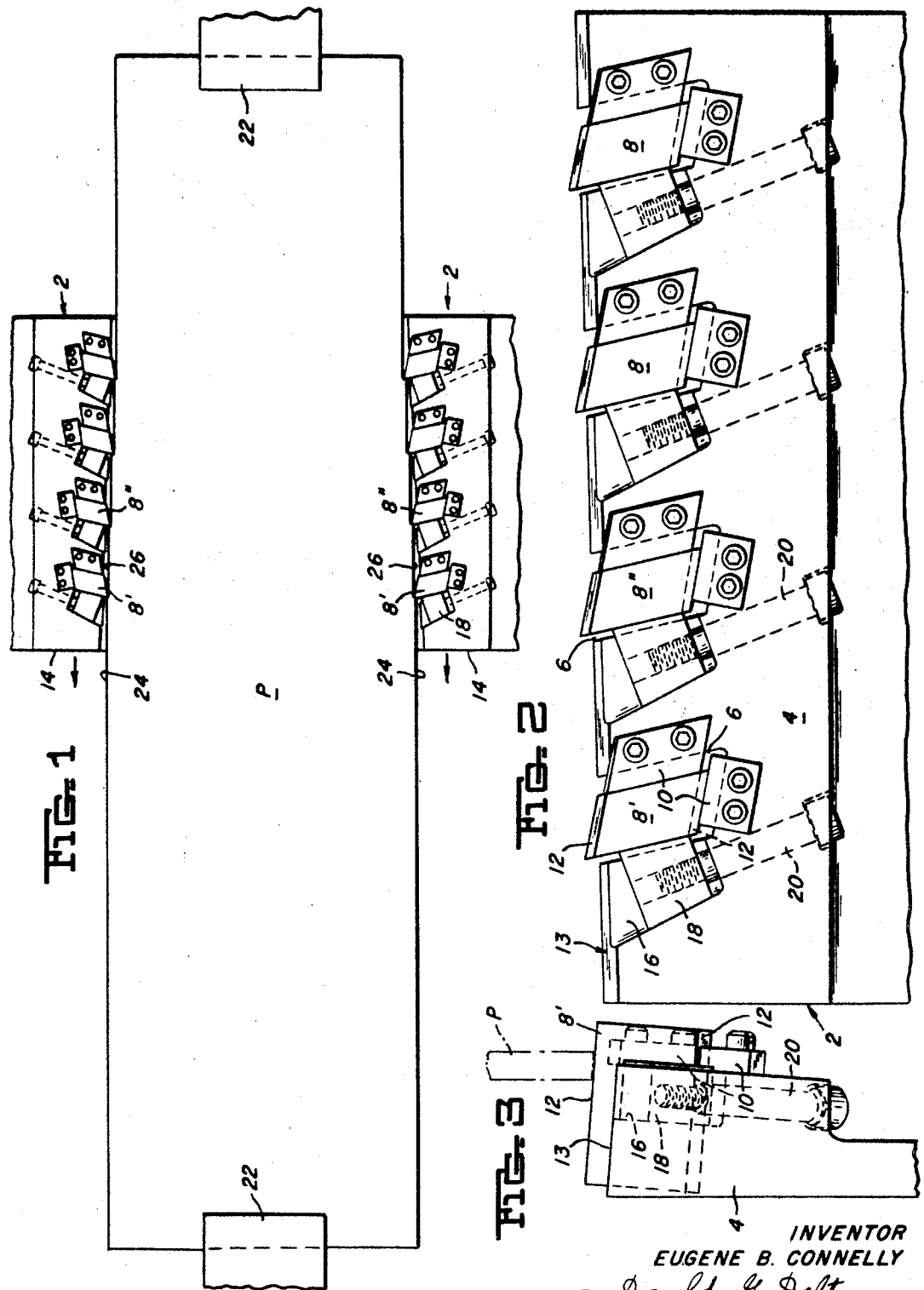

3,460,220
TOOL FOR PLANING PLATE EDGES
Eugene B. Connelly, Churchill, Pa., assignor to United
States Steel Corporation, a corporation of New Jersey
Filed Sept. 29, 1965, Ser. No. 491,241
Int. Cl. B23d 1/18; B23p 15/38
U.S. Cl. 29—95.1                        2 Claims

ABSTRACT OF THE DISCLOSURE

Tool of the invention includes a tool holder formed with a shank portion having a longitudinal edge, inclined outwardly from the leading end of the holder. Cutters of parallelogram shape are inserted in notches spaced along the inclined edge. Each cutter is fixed in position in its notch by positioning plates secured in overlapping relation to two adjacent sides of the notch. Each of the cutters projects from the inclined edge of the tool holder the same distance whereby a stepped cutting means is effected.

---

The present invention relates generally to metal working tools and more particularly to an improved gang-cutter tool especially suitable for planing plate edges.

In the manufacture of welded pipe from steel plate, it is necessary to prepare the plate for forming and welding by planing both edges of the plate so as to produce a plate of exact width having straight and parallel edges. Since most steel plates vary in width and often have edges with a distinct curvature, plates being sufficiently oversize in width to assure the desired finished dimensions after planing must be used. This oversize requirement gives rise to a heavy stock removal problem which requires in turn a multitool cutting machine for optimum operations which will produce a good machined surface finish.

Prior to my invention, each tool of such a multitool machine had to be individually positioned by the operator to produce the proper "shared load." This was a slow and often incorrectly done procedure which resulted in poor tool life and unnecessary delay. Further, planing tools in use prior to my invention required regrinding after each use which resulted in additional expense and delay.

It is, accordingly, the primary object of my invention to provide an improved gang-cutter tool for planing plate edges which is simple and rugged in construction and achieves relatively long tool life and good machine surface finishes without the necessity of frequent adjustment.

It is a more specialized object of my invention to provide an improved gang-cutter tool for planing plate edges which includes a tool holder body having a shank portion formed with notches spaced therealong adapted to receive cutters of parallelogram shape, positioned by positioning plates secured to two adjacent sides of each of the notches; and secured in position by a wedge fitted in a wedge recess adjacent each of the notches.

As a corollary to the above it is another object of my invention to provide cutters having cutting edges on two opposite sides thereof whereby a new cutting edge can be presented merely by turning the cutter 180°.

It is another object of my invention to provide an improved gang-cutter tool as set forth by the objects above in which the cutters are so positioned relative to the tool holder shank that they constitute a stepped cutting means projecting progressively greater distances from the longitudinal center line in the tool holder shank in the direction away from the leading end of the tool holder.

These and other objects will become more apparent after referring to the following specification and attached drawings, in which:

FIGURE 1 is a plan view of a preferred embodiment of my invention shown in position relative to a plate the edges of which are to be planed preparatory to forming welded pipe;

FIGURE 2 is an enlarged plan view of one tool holder of the invention; and

FIGURE 3 is an end view looking at the left end of FIGURE 2.

Referring more particularly to the drawing, reference numeral 2 designates generally the tool holder body of my invention which is formed with a shank portion 4 having notches 6 spaced therealong. A cutter 8 of generally parallelogram shape and made of tungsten carbide or similar material is positioned in each of the notches 6. In order to facilitate understanding the operation of the invention, the cutters immediately adjacent the leading end 14 of each of the tool holders 2 have been designated 8' and the cutter immediately adjacent each cutter 8' has been designated 8".

Positioning plates 10 are secured to the tool holder body 2 in overlapping relation to two adjacent sides of each of the notches 6 and serve to fix cutters 8 in position with a cutting edge 12 projecting beyond the tool holder body 2. Each of the cutters is provided with two cutting edges 12 one of which normally projects from the tool holder body and the other bears against one of the positioning plates 10 so that a new cutting edge can be placed in operative position merely by reversing a cutter 180° in its notch. The parallelogram geometry of each cutter is so designed as to provide a desired clearance angle and rake angle for proper cutting action.

As best shown in FIGURE 2, the edge 13 of the shank portion 4 in which the notches 6 are formed is inclined outwardly from the longitudinal center line of the tool holder in the direction away from the leading end 14 thereof. Each of the cutters 8 projects from the inclined edge 13 a uniform distance and as a result the exposed cutting edges 12 of the cutters 8 form a stepped cutting means so that the successive cutters engage successive edge surfaces on a plate edge being planed.

A wedge recess 16 is formed in the shank portion 4 adjacent each of the notches 6 and a wedge 18 is fitted into each of the recesses 16 for engaging the cutters and securing them in position. As best shown in FIGURE 2, each of the wedges is drawn into and held in its recess by means of a bolt 20 having one end threaded in the wedge.

In operation, a pair of tool holders 2, driven by lead screws (not shown), is installed in the ways of a conventional edge planer (not shown) in a conventional manner and a plate P having edges to be planed is rigidly clamped, by suitable clamping means 22 at each end, in position between the paths of travel of the shank portions 4 of the tool holders 2. The tool holders are then driven simultaneously in the direction indicated by the arrows in FIGURE 1 so as to bring the exposed cutting edge 12 of the cutters 8' into machining contact with the edges 24 of the plate P. As the tool holders are moved along the edges of the clamped plate P, the cutters 8' will remove stock from the edges 24 of the plate back to a new edge 26 which will be engaged and removed by the cutters 8" in the tool holders. In this way each of the cutters 8 on opposite sides of the plate P will remove a predetermined amount of metal from the edges of the plate. It will be noted that the number of cutters provided by my invention can be varied proportionally to the desired chip-load per cutter and the maximum stock removal which will be encountered. The desired chip-load per cutter depends upon the distance the cutter projects from the inclined edge 13. This distance is substantially fixed by the positioning plates 10 so that no operator adjustment is required except a slight one to expose another portion of the cutting edge as it becomes worn. For example, when a cutter becomes dull from use, the operator need only loosen the bolt 20 to unseat the wedge 18 adjacent the cutter and then slightly raise or lower the cutter in its notch 6 to expose an unused portion of the cutting edge. In this way the entire cutting edge of the cutter becomes a usable cutting surface. Furthermore, by removing a cutter from its notch and replacing it rotated 180° an entire new cutting edge 12 will be exposed. None of these adjustments or even total cutter replacement in any way disturb the predetermined chip-load, which depends on the distance each cutter projects from the inclined edges 13 so that the operator can quickly change or minutely adjust the cutters. No cutter regrinding is required with my invention inasmuch as full cutting edge utilization can be achieved from the initial grinding performed by the cutter manufacture. It will be further noted that the pressure of the cut tends to seat the cutter naturally into the pocket formed by the positioning plates 10 with the wedges 18 serving only as friction type retainers to hold the cutters in the desired position. This permits each cutter to be initially located at its uppermost position, and then progressively lowered for new cutting edges by striking the cutter with a soft hammer, without disturbing the cutter adjustment or even loosening the wedge 18.

Although I have shown but one embodiment of my invention, it will be apparent that other adaptations and modifications may be made without departing from the scope of the following claims.

I claim:

1. Apparatus for planing plate edges comprising a tool holder having a shank portion with a notch therein, a cutter of parallelogram shape positioned in the notch, said cutter being slidably adjustable transversely of said shank portion to thereby expose successive previously unused cutting edge portions thereof to said plate as said cutter wears, positioning plates secured in overlapping relation to adjacent sides of said notch fixing the cutter in position projecting beyond the shank, said shank having a wedge recess therein adjacent said notch, and a wedge positioned in said recess engaging said cutter.

2. Apparatus for planing plate edges which comprises an elongated tool holder having a leading end and a shank portion with at least one longitudinally inclined edge, said edge being inclined outwardly from said leading end, said edge having a plurality of notches spaced therealong, a cutter of parallelogram shape positioned in each of said notches, said cutters being slidably adjustable transversely of said shank portion to thereby expose successive previously unused cutting edge portions thereof to said plate as said cutters wear, positioning plates secured in overlapping relation to at least two adjacent sides of each of said notches fixing said cutters in position projecting beyond said inclined edge of said shank, a cutting edge on the projecting portion of each of said cutters, each of said cutting edges projecting from said inclined edge the same distance whereby said cutting edges constitute a stepped cutting means projecting progressively greater distances from the longitudinal center line of said shank in the direction away from said leading end, said shank having a wedge recess therein adjacent each of said notches, and a wedge positioned in each of said recesses engaging the cutter in the notch adjacent thereto.

References Cited

UNITED STATES PATENTS

| | | | |
|---|---|---|---|
| 1,958,147 | 5/1934 | Kelley | 29—95 |
| 2,173,074 | 9/1939 | Romaine | 29—95.1 |
| 2,537,709 | 1/1951 | Schermerhorn | 29—96 |
| 2,770,027 | 11/1956 | Bonnafe | 29—95.1 |
| 3,126,611 | 3/1964 | Wiles | 29—95.1 |
| 3,138,847 | 6/1964 | Berry | 29—105 |
| 3,178,801 | 4/1965 | Krueger | 29—96 |

HARRISON L. HINSON, Primary Examiner

U.S. Cl. X.R.

29—96; 90—24